Figure 1:
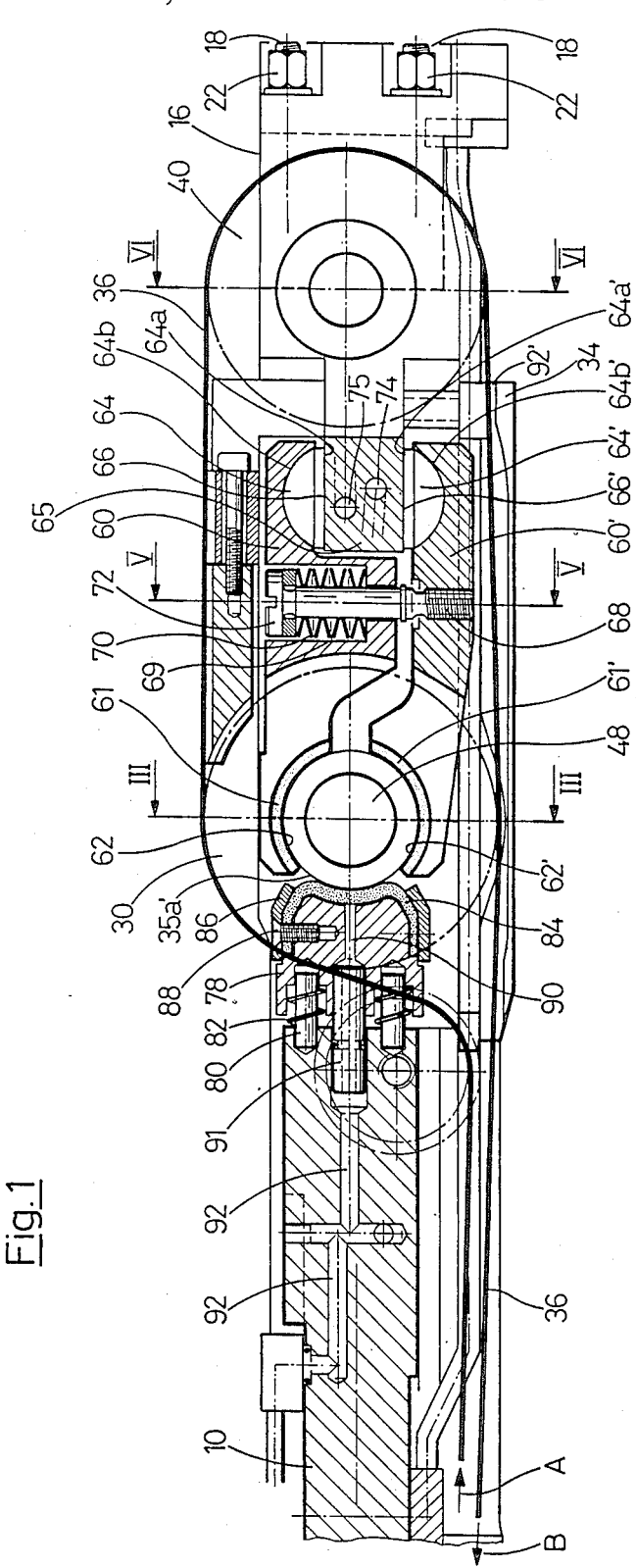

United States Patent [19]

Portmann et al.

[11] Patent Number: 4,641,008
[45] Date of Patent: Feb. 3, 1987

[54] APPARATUS FOR ELECTRICAL RESISTANCE SEAM WELDING BY ROLLERS

[75] Inventors: Niklaus Portmann, Bellikon; Alfonso D'Aniello, Urdorf, both of Switzerland

[73] Assignee: Elpatronic AG, Switzerland

[21] Appl. No.: 800,554

[22] Filed: Nov. 21, 1985

[30] Foreign Application Priority Data

Nov. 23, 1984 [CH] Switzerland ................. 5601/84

[51] Int. Cl.$^4$ ............................................. B23K 11/06
[52] U.S. Cl. ...................................... 219/84; 219/81; 219/119; 219/120
[58] Field of Search ................... 219/61.7, 64, 80, 81, 219/82, 83, 84, 119, 120

[56] References Cited

U.S. PATENT DOCUMENTS 4,188,523  2/1980  Kawai et al. ................. 219/71

FOREIGN PATENT DOCUMENTS 2244296  9/1972  Fed. Rep. of Germany .
636548  12/1978  Switzerland .

Primary Examiner—H. Broome
Assistant Examiner—Lincoln D. Donovan
Attorney, Agent, or Firm—McCormick, Paulding & Huber

[57] ABSTRACT

The apparatus described is so constructed that narrow can bodies having an internal diameter of 52 mm for example can be produced from rounded blanks by welding the edges of the blanks. The supply of welding current to the electrode roller is effected through copper caps, a clamping member, contact members disposed at each side thereof, contact jaws silver contact segments and peripheral surfaces of wide hubs which are provided on the electrode roller. The contact jaws engage the hubs of the electrode roller at both sides of the roller from above and below, as a result of which there is a large area for the transmission of current and a low specific contact pressure. The hub surfaces, which form the actual contact surfaces of the electrode roller, are continuously lubricated through felt lubricating segments. The contact pressure of the contact jaws can be adjusted in a simple manner by means of a screw. The whole apparatus and particularly the electrode roller are extensively cooled internally by a special cooling device.

14 Claims, 9 Drawing Figures

APPARATUS FOR ELECTRICAL RESISTANCE SEAM WELDING BY ROLLERS

The invention relates to an apparatus of the type given in the preamble to patent claim 1.

The invention further relates to an electrode roller particularly provided therefor and a welding-current supply.

In a known apparatus of the above-mentioned type (L. Pfeifer, Fachkunde des Widerstandsschweissens, Verlag W. Girardet, Essen, 1969, pages 63–65), the electrode roller is secured to a flanged shaft disposed transversely to the welding arm. The transmission of current to the rotating electrode roller is effected through pairs of contact jaws, the curved contact surfaces of which are in contact with the peripheral surface of the shaft rotating with the electrode roller. Each pair of contact jaws is pressed, by means of a screw and associated spring elements, at one end against the shaft and at the other end against current-carrying surfaces through normally-closed contact members. This whole arrangement is accommodated in a closed housing which contains an oil bath in which the flanged shaft, with the ends of the contact jaws associated therewith, is immersed. The current-carrying surfaces against which the normally-closed contact members can be pressed are provided on a cover of this housing. The housing cover acts as an electrical conductor and receives the welding current directly through a cable connected thereto. The flanged shaft contains a central passage through which cooling water is supplied to the cooling passages in the electrode roller. In addition, cooling pipes are laid in the housing, inside the oil bath, to cool the lubricating oil. Because of the eccentric arrangement of the electrode roller, that is to say at one end of the flanged shaft, and because of cooling-water connections for the electrode roller, provided at the opposite end of the shaft, such a roller head cannot be introduced into rounded blanks from which narrow can bodies having an internal diameter of 52 mm for example are to be produced by welding the edges of the blank. For this purpose, the electrode roller would have to be disposed centrally and the cooling water connections for the electrode roller should not be provided at the end of the flanged shaft opposite to it. In addition, the housing, which has to be made large because of the oil bath, would make this application impossible. Furthermore, the lubricating device described and the cooling device described would not allow the housing and the position of the welding roller to be adapted to the said purpose and at the same time a satisfactory lubrication of all relatively rotatable contact surfaces, an effective cooling of the electrode roller and a low-loss supply of welding current to the electrode roller to be maintained.

Furthermore, an apparatus for electrical resistance seam welding by rollers is already known (DE-OS No. 27 47 222) wherein the electrode roller is disposed centrally so that this apparatus could be developed so that it could be used for welding inside narrow can bodies of the said type. In this known apparatus, however, the welding current is not supplied to the electrode roller through sliding contacts. Instead, a known type of construction of electrode roller is used (for example in accordance with CH-PS No. 636 548 or US-PS No. 4 188 523), wherein the electrode roller consists of a stator, the spindle of which is clamped in the welding arm, and of a rotor mounted for rotation on the stator. Provided between the stator and the rotor is an annular gap in which there is a liquid metal, for example mercury or a gallium alloy which serves to transmit the current from the stator to the rotor. Such electrode rollers are expensive to produce, require careful sealing and constant checking of this sealing (for example by means of corresponding sensors), in order that their current-transmitting and cooling characteristics may be ensured. In such electrode rollers, the cooling ducts only reach to within the vicinity of the circumference of the stator so that the cooling of the rotor has to be effected through the liquid metal. This is not very effective because the metals generally used are not particularly good conductors of heat. In addition, in comparison with copper, they are not very good electric current conductors either so that the supply of welding current to the rotor of the electrode roller suffers from losses. When a gallium alloy is used as liquid metal, problems may arise as a result of the fact that this metal alloy can solidify already at temperatures not much below room temperature and so block the electrode roller. Special precautions must therefore be taken to keep the electrode roller above the solidification temperature of the metal alloy by heating.

Finally, a heavy-current carrier for a roller-type seam welding machine is known for transmitting the welding current from a current shoe to a trailing roller shaft. The current shoe consists of a sleeve carrying contact laminations and engaging round the trailing roller shaft, the laminations being subject to the load of a helical spring and each carrying silver graphite contacts which bear against the circumference of the trailing roller shaft rotating in the sleeve. The trailing roller is secured to one end of the trailing roller shaft and the cooling of the trailing roller and of the heavy-current carrier is effected through the trailing roller shaft which is provided with a cooling passage and into which a cooling element can be introduced. This known heavy-current carrier therefore has the same disadvantages as the known apparatus first described at the beginning, with regard to its space requirements and the electrode roller arrangement.

It is the object of the invention to develop an apparatus of the type mentioned at the beginning so that narrow can bodies, for example with an internal diameter of 52 mm or less, can be produced from rounded blanks by welding the edges of the blanks, while retaining a satisfactory lubrication of all relatively rotatable contact surfaces, an effective cooling of the electrode roller and a low-loss supply of welding current to the electrode roller and avoiding liquid metal for the current transmission inside the electrode roller.

In the apparatus according to the invention, the electrode roller is provided, at each side of the narrow disc-shaped centre portion, with two wide cylindrical hubs against which the curved contact surfaces of the contact jaws bear so that the welding current can be supplied directly and so with little loss to the rotor of the electrode roller. The supply of welding current to the contact jaws is likewise effected with little loss through the welding arm, the caps placed on the spindles of the electrode rollers and the web of the clamping member which carries the current-carrying surfaces against which the contact members of the contact jaws bear with a large area. The contact jaws engage round the electrode roller at both sides, below and above, with their fork-shaped ends, which results in a large current transmitting area and therefore renders possible a low specific contact pressure. As a result of an optimum relationship between the diameter of the electrode roller hubs and the arc length of the curved contact surfaces of the contact jaws, a low frictional resistance results. As a result of the cooling ducts reaching to within the vicinity of the outer surface of the middle portion of the electrode roller, a particularly effective cooling of the electrode roller is possible, these cooling ducts being supplied, in a space-saving manner, through cooling ducts in the welding arm and in the electrode-roller spindle. The peripheral surfaces of the hubs of the electrode roller are continuously lubricated through felt lubricating segments. As a result, not only is mechanical wear between the relatively rotatable contact surfaces restricted to a minimum but also an expensive housing with lubricating oil disposed therein and cooling pipes passing through this is avoided.

It is true that the use of contact members rotatably mounted in the contact jaws is known per se (DE-AS No. 22 44 296), but in the known case the contact members constructed in the form of rollers serve to transmit the current to contact jaws which bear, through silver contact shells, against a shaft and are pressed against the associated contact surfaces by rubber springs disposed between them and the housing. The housing likewise contains an oil bath in which the shaft is immersed. This known means of supply of welding current to a shaft of an electrical resistance welding maching therefore has the same disadvantages as the known apparatus first described at the beginning, with regard to the above-mentioned application.

The apparatus according to the invention can be produced with a very small structural size circumferentially so that it is very well suited for the production of narrow can bodies with an internal diameter of 52 mm for example, from rounded blanks by welding the edges of the blanks.

In the development of the invention, an optimum cooling of the electrode roller results because the cooling water is supplied at one side through the caps and the one half of the electrode-roller spindle, is conveyed substantially radially outwards to within the immediate vicinity of the outer circumference of the disc-shaped centre portion of the electrode roller and back through a cooling duct arrangement in mirror image into the electrode roller spindle and is conveyed out of this and through the welding arm to the opposite longitudinal side.

In a further development of the invention, the electrode roller spindle consists of a material which is mechanically very robust and load-bearing, on which rolling bearings carrying the electrode roller rotor can be disposed so that the electrode roller can be mounted without play, which is important for a satisfactory welding result.

In a further development of the invention, the contact members form pivot points about which the contact jaws can pivot, at least parallel to the electrode roller spindle, when the relatively rotatable contact surfaces become worn. The contact members can move freely in all directions and adapt themselves to the current-carrying surfaces which are likewise constructed intensively and complementarily to the contact surface.

In a still further development of the invention, the contact jaws can also additionally pivot about their longitudinal axis if there is no precise parallelism between the axis of the electrode roller and the current-carrying surfaces or if this parallelism should have been lost in the course of time.

Although all the current-transmitting parts of the apparatus consist of a metal which is a good electrical conductor, such as electrode copper for example, nevertheless the contact can be considerably improved by coating the contact members and all contact and current-transmitting surfaces with precious metal.

In one development of the invention, an optimum relationship is achieved with regard to the frictional resistance and the contact pressure at the relatively rotatable contact surfaces. In one embodiment of the invention, neither lubricant nor dirt can reach the work to be welded. A further development of the invention relates to an apparatus for the electrical resistance seam welding by rollers of metal-coated very thin sheets such as are used, in particular, in the canning industry.

In this apparatus, the electrode roller serves as a pressure member which presses the copper wire guided in a wire groove at the outer circumference of the electrode roller against the work to be welded. The copper wire is used because during the resistance welding or iron sheets coated with tin, zinc, lead, etc., the copper of the electrode roller would form alloys with the coating material of the work to be welded and be contaminated as a result. The characteristics of the electrode roller would be altered by this alloy formation and as a result, the formation of the weld structure would be impaired. Since, in the apparatus, only the copper wire comes into contact with the work to be welded, only the copper wire is contaminated but not the electrode roller. The copper wire is constantly replaced and is guided over the guide roller which has a somewhat smaller diameter than the electrode roller. The electrode roller exerts the actual welding pressure in cooperation with an outer welding roller which presses against the work to be welded from the outside. Because of the application provided for here, the electrode roller has an external diameter of about 48 mm for example while the outer welding roller has a diameter of 85 mm for example. Since the ratio between the diameters of the electrode roller and of the outer welding roller should be 1:1, in this development of the invention, a large diameter of the electrode roller is simulated by the fact that the copper wire is drawn along the work to be welded for a certain distance before it is pulled over the guide roller having a somewhat smaller diameter. If that is not necessary, the copper wire could, of course, be guided only over the electrode roller. In this case, it would merely be necessary for the electrode roller to be preceded by a small guide roller which could appropriately be provided in the region of the felt lubricating segments between the fork arms of the welding arm.

A further coolant circuit is provided which leads through the axis of the guide roller, the longitudinal arm of the clamping member and the transverse web of the clamping member and ensures an effective internal cooling of the guide roller.

The electrode roller of the present invention is provided in particular for an apparatus narrow can bodies with an internal diameter of 52 mm for example can be produced from rounded blanks by welding the edges of the blanks together apparatus retains a satisfactory lubrication of all relatively rotatable contact surfaces, an effective cooling of the electrode roller and a low-loss of welding current supply to the electrode roller while avoiding liquid metal for the transmission of current inside the electrode roller. Nevertheless, the electrode roller is further suitable for any electrical resistance seam welding apparatus with rollers regardless of the circumferential structural size thereof because the peripheral surfaces of the broad cylindrical hubs provided at both sides of the center portion of the electrode roller, which surfaces form the electrical contact surfaces, render the supply of welding current to the electrode roller possible by means of sliding contacts. Also, the coolant conveyed to within the immediate vicinity of the outer circumference of the centre portion of the electrode roller permits an intensive cooling of the electrode roller. The electrode roller can therefore be used in all apparatuses for electrical resistance seam welding by rollers, wherein a low-loss supply of welding current to the electrode roller is important, liquid metal is to be avoided for the transmission of current and an intensive cooling of the electrode roller is necessary.

Although the supply of welding current to an electrode roller in accordance with the invention is likewise intended in particular for such an apparatus, nevertheless it can be used in all apparatuses of this type in which it is important to supply the welding current, with as little loss as possible, to an electrode roller disposed centrally on the welding arm, wherein the use of liquid metal for the transmission of current is to be avoided. It is actually only necessary to provide the electrode roller with two broad cylindrical hubs at both sides of the disc-shaped centre portion and to bring the peripheral surfaces of the hubs into contact with the curved contact surfaces on the fork-shaped ends of the contact jaws and in addition to press the contact jaws against the current-carrying surfaces through the contact members rotatably mounted therein, at their opposite ends.

In the current supply of the one embodiment of invention, the advantage already explained above results in the event of any non-parallelism between the axis of the electrode roller and the current-carrying surfaces.

One example of embodiment of the invention is described in more detail below with reference to the drawings.

Figure 2:
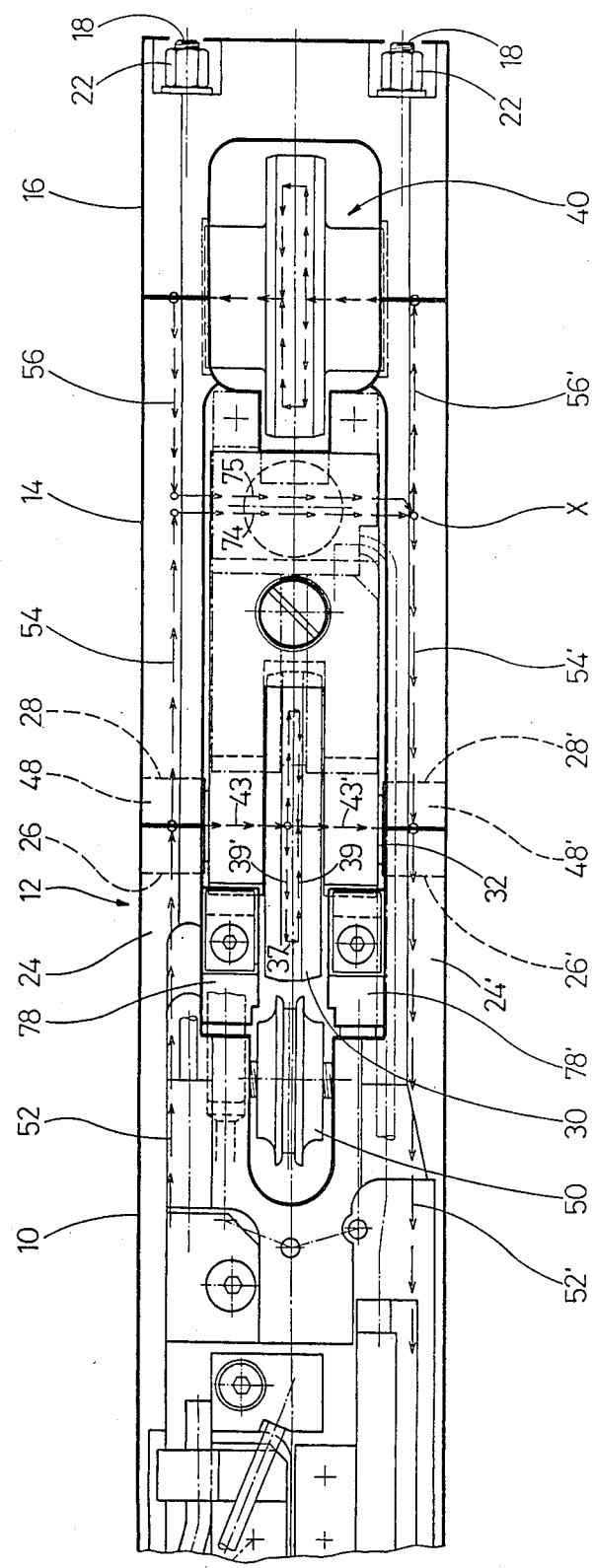
Figure 3:
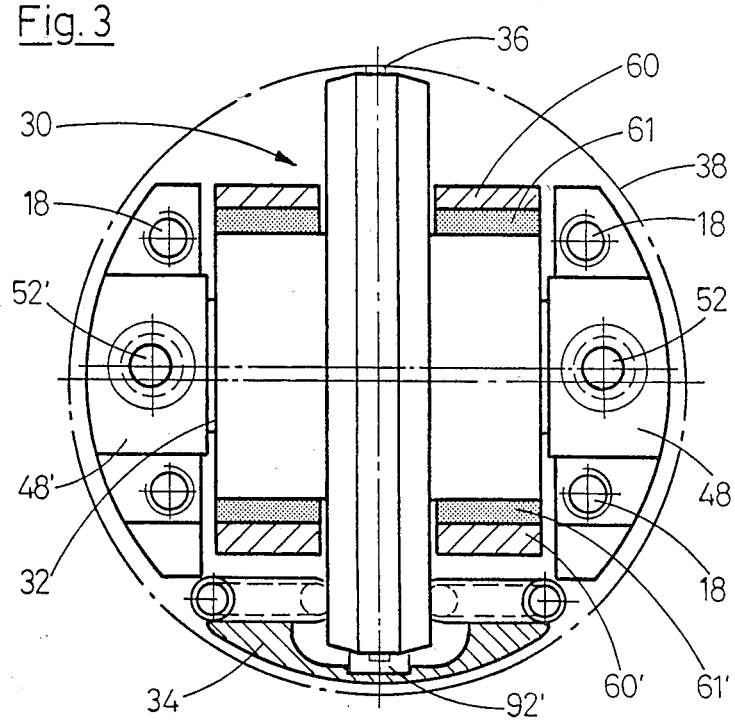
Figure 4:
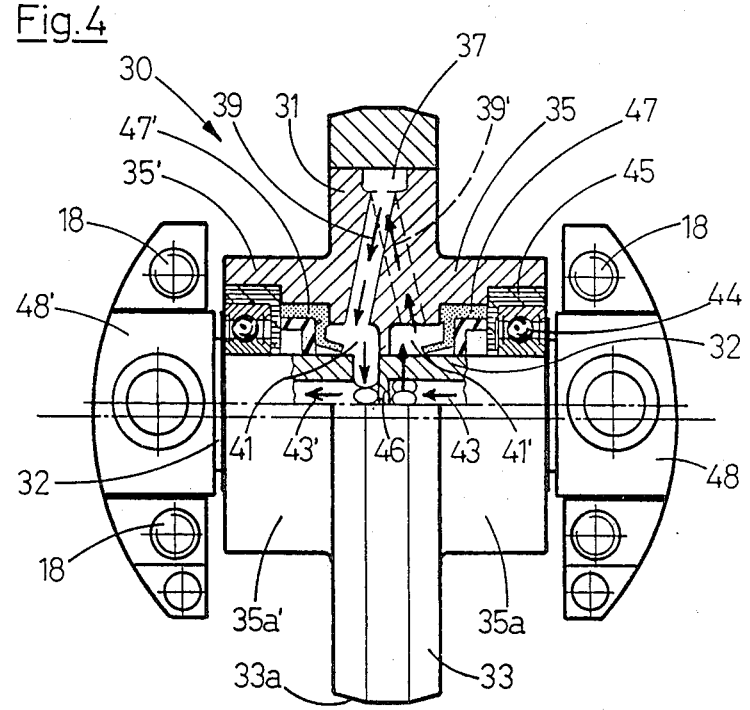
Figure 6:
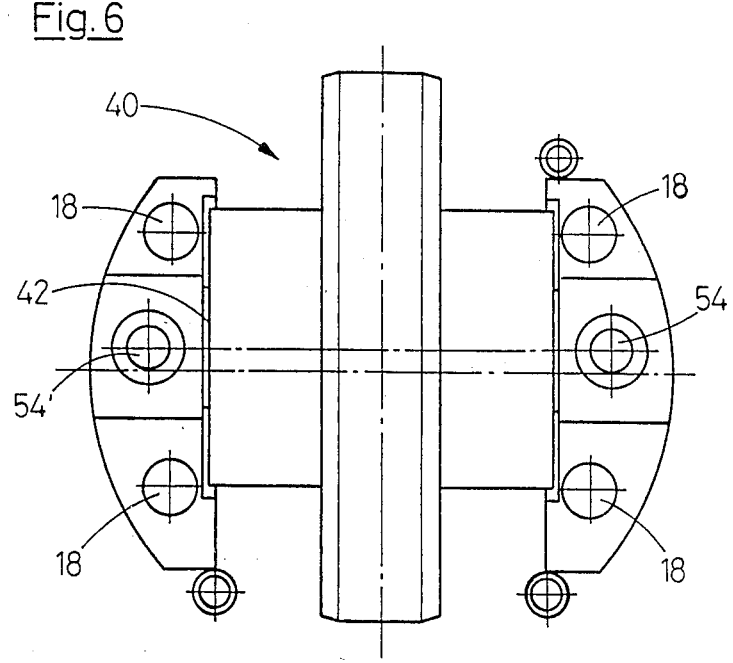
Figure 5:
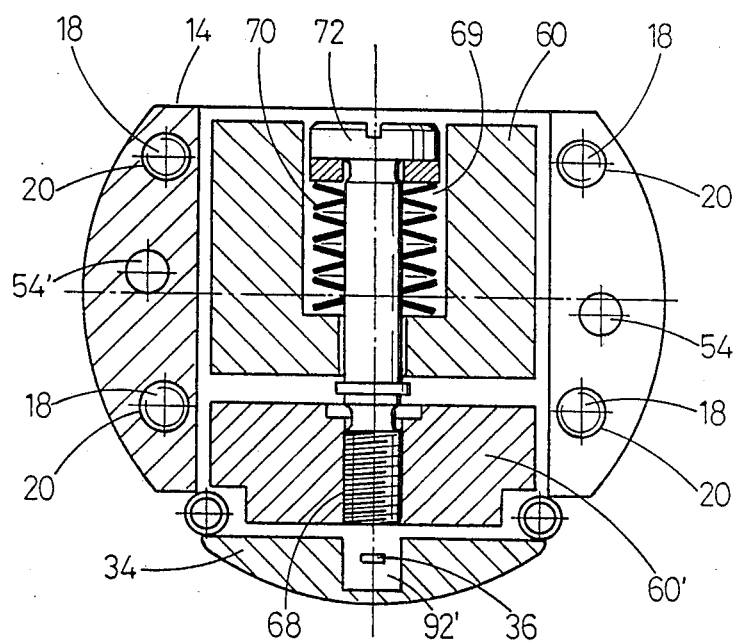
Figure 7:
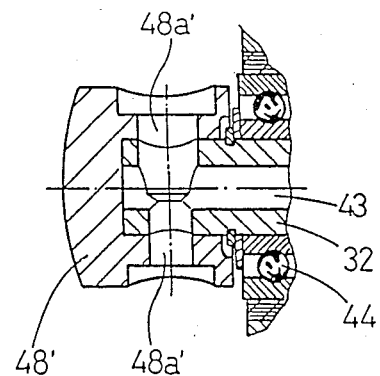
Figure 8A:
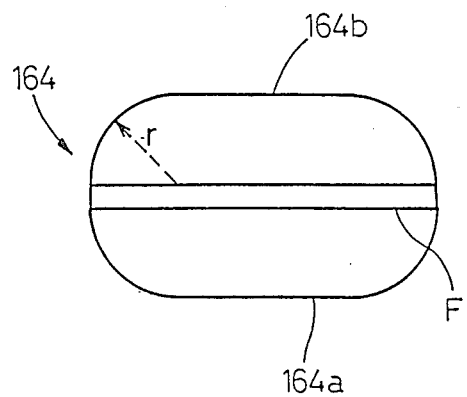
Figure 8B:
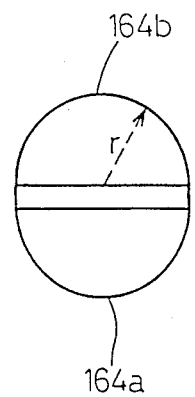

FIG. 1 shows a longitudinal sectional view of the lower welding arm of an electrical roller-type resistance seam welding machine with the apparatus according to the invention, FIG. 2 shows the apparatus of FIG. 1 in plan view, FIG. 3 shows a cross-sectional view on the line III—III in FIG. 1, FIG. 4 shows the internal construction of a roller electrode in the same view as in FIG. 3, FIG. 5 shows a cross-sectional view on the line V—V in FIG. 1, FIG. 6 shows a cross-sectional view on the line VI—VI in FIG. 1, FIG. 7 shows the internal construction of a cap placed on the spindle of the electrode roller, and FIGS. 8a and 8b show a further form of embodiment of a contact member in side view respectively and in end view.

FIGS. 1 to 8 show an apparatus for electrical resistance seam welding by rollers. In FIG. 1, a welding arm 10, which is secured to the upright of an electrical roller-type resistance seam welding machine not illustrated, extends out from the machine towards the right. The free end 12 of the welding arm 10 extends to within the plane of the section III—III illustrated in FIG. 3. Following on the free end 12 of the welding arm 10 to the right in FIG. 1 is a clamping member 14 which reaches as far as the plane of the section VI—VI. Finally, following on the clamping member 14 is a head member 16. Four long threaded bolts 18 are screwed into the free end 12 of the welding arm 10. The clamping member 14 and the head member 16 are each provided with through bores 20 which receive the threaded bolts 18. In FIGS. 1 and 2, the clamping member 14 and the head member 16 have been pushed onto the threaded bolts 18 from right to left and held by tightening nuts 22 on threaded ends of the through bolts. When the welding machine is in operation, the welding arm 10, the clamping member 14 and the head member 16 carry the welding current and therefore consist of a material which is a good electrical conductor, preferably of copper.

The welding arm 10 is of forked construction at its free end 12 and therefore has two fork arms or forks 24, 24'. (The same reference numerals but provided with a prime designate the other part of a pair of parts of like construction in each case.) Provided in the ends of the fork arms 24, 24' are bearing depressions 26, 26' which, together with bearing depressions 28, 28' formed in the adjacent ends of the clamping member 14, receive the spindle 32 of an electrode roller 30 to clamp the spindle 32 to the welding arm 10. The ends of the head member 16 and of the clamping member 14 adjacent to one another have the same construction as the adjacent ends of the welding arm and of the clamping member 14 and the ends of the spindle 42 of a guide roller 40 are gripped between them. A smaller guide roller 50 is rotatably secured between the fork arms 24, 24'. Secured to the underside of the clamping member 14 and of the free end 12 of the welding arm 10 is a cover 34, the purpose of which is explained in more detail below. A copper wire 36 which is rectangular in cross-section is supplied at the left in FIG. 1 (arrow A), moves down round the guide roller 50 and upwards over the electrode roller 30 and from this round the guide roller 40 and back out of the apparatus again (arrow B). In the region of the upper limit of the electrode roller 30, the copper wire 36 is pressed against the work 38 to be welded (see FIG. 3) which, in the example of embodiment described here are rounded blanks from which narrow can bodies with an internal diameter of 52 mm for example are produced by welding the edges of the blanks. In FIG. 1, the rounded blanks 38 are fed from the left towards the right, which is not described in detail because it is not part of the invention.

FIG. 4 shows the construction of the electrode roller 30. A rotor 31 is rotatably secured to the spindle 32 of the electrode roller 30 by means of rolling bearings 44. Disposed between the rotor 31 and the rolling bearings 44 are bushes 45 of insulating material which separate the rotor 31 electrically from the spindle 32. The rotor 31 has a narrow disc-shaped centre portion 33 and two broad cylindrical hubs 35, 35', the peripheral surfaces 35a, 35a', of which form two rotating annular contact surfaces in the manner of slip rings and serve to transmit current to the electrode roller 30 as is described in more detail below. Immediately below its outer peripheral surface 33a, the centre portion 33 of the rotor 31 contains an annular cooling duct 37 which is in communication, through substantially radial cooling ducts 39, 39' and two annular chambers 41, 41', with two axial cooling ducts 43, 43' inside the spindle 32 of the electrode roller. The annular chambers 41, 41' are bounded by seals 47 and 47' respectively at the rolling-bearing side. The two cooling ducts 43, 43' are separated from one another by a central wall 46. The flow of the coolant (for example water) is indicated by arrows in FIGS. 2 and 4 and will be described in more detail below. Placed on each end of the spindle 32 of the electrode roller 30 is a cap 48 or 48' which is a good electrical conductor (for example consisting of copper) and which is clamped between the bearing depressions 26, 28 or 26', 28' adjacent to one another to transmit the welding current from the welding arm 10 to the clamping member 14. The ends of the spindle 42 of the guide roller 40 carry corresponding caps which are clamped between the corresponding bearing depressions of the clamping member and of the head member. The spindles 32 and 42 each consist of stainless, non-magnetic steel. Apart from a smaller diameter, the guide roller 40 has the same construction as the electrode roller 30 although no welding current is transmitted to the guide roller but it is nevertheless likewise intensively cooled in order to eliminate heat supplied to it through the clamping member 14 and the copper wire 36. The caps 48, 48' of the electrode roller 30 are provided with bores 48a' (see FIG. 7) which establish a connection between the cooling ducts 43, 43' and cooling ducts 52 and 52' which are provided in the fork arms 24, 24' of the welding arm 10, lead into their bearing depressions 26, 26' and are in communication with cooling ducts 54, 54' which are provided in the clamping member 14 (see FIGS. 2 and 5).

Two contact jaws 60, 60' are provided to supply welding current to the electrode roller 30. The contact jaws 60, 60' are each forked in construction at their end adjacent to the welding arm 10 and embrace the electrode roller 30 with their fork arms. The fork arms of the contact jaws 60, 60' are provided, at their sides adjacent to the hubs 35, 35', with curved contact surfaces 62, 62' with which they bear above and below on the generated surfaces 35a, 35a' of the hubs in each case. The contact jaws consist of a material which is a good electrical conductor (for example copper) and their curved contact surfaces 62, 62' are coated with precious metal (for example silver) or provided on silver contact segments 61, 61' in order to establish a satisfactory electrical contact between the contact jaws and the rotor 31 of the electrode roller 30 through its hubs 35, 35'. Disposed at the opposite ends of the contact jaws 60, 60' are two contact members 64 and 64' respectively which consist of the same material as the contact jaws and are likewise coated with precious metal (for example silvered). At their sides adjacent to one another, the contact members 64, 64' have plane surfaces 64a, 64a' with which they bear against current-carrying surfaces 66 and 66' respectively of a transverse web 65 which connects the longitudinal arms of the clamping member 14 to one another. The surfaces 64b, 64b' opposite to the plane surfaces 64a, 64a' are constructed in the form of spherical segments. The contact members 64, 64' engage, with the surfaces 64b, 64b', in bearing seats of complementary construction in the contact jaws. Thus the surfaces 64b, 64b' in the form of spherical segments form pivot-bearing surfaces on which the contact jaws are mounted for pivotal movement on all sides. Instead of the contact members 64, 64' described above, roller-shaped contact members may also be used which then have cylindrical surfaces instead of the surfaces in the form of spherical segments and provide larger areas for the passage of current as is described in more detail below with reference to FIG. 8. In the latter case, the contact jaws 60, 60' are only pivotable about axes parallel to the spindle 32 of the electrode roller so that they would not be able to compensate for any lack of parallelism between these axes. The contact jaw 60' illustrated at the bottom in FIG. 1 has a tapped bore 68. The upper contact jaw 60 has a stepped bore 69 in the broader portion of which a spring 70 is inserted. A screw 70 extends through the spring 70 and with clearance through the narrower part of the stepped bore 69 and is screwed into the tapped bore 68 as illustrated in FIG. 1. By tightening the screw 70 to a greater or lesser extent, it is possible to adjust the contact pressure with which the contact jaws 60, 60' press on the hubs 35, 35' and on the contact members 64, 64'. In the example described here, the contact pressure is adjusted so that, at the contact members 64, 64', it amounts to one to two times the contact pressure at the hub surfaces 35a, 35a'. The contact members 64, 64' are freely movable with their plane surfaces 64a, 64a' on the current carrying surfaces 66, 66' so that they can automatically adapt their position so that there is always satisfactory contact between the contact jaws 60, 60' and the hub surfaces 35a, 35a'. Provided in the transverse web 65 are two cooling ducts 74, 75 which are in communication with the cooling ducts 54, 54' and 56, 56' in the longitudinal arms of the clamping member 14 and also with one another in one of the longitudinal arms of the clamping member 14 at a point X (see FIG. 2).

The apparatus described here is provided with a lubricating device which can be seen in FIGS. 1 and 2. Two felt lubricating segments 78, 78' are provided between the fork arms 24, 24'. The lubricating segments 78, 78' are each displaceable in the longitudinal direction of the welding arms on two pins 80 secured to the welding arm 10 and are pressed with their felt linings 84 against the hub surfaces 35a and 35a' by the springs 82 which are disposed between the welding arm and each lubricating segment. The felt lining 84 is secured to the lubricating segment 78 by means of pressure plates 86 and screws 88. Each lubricating segment 78 contains a bore 90 which is in communication, through a small tube 91 displaceable in the welding arm, with a bore 92 provided in the welding arm 10. Contact oil is supplied to the bore 92 through a pump not illustrated. The pump is actuated periodically (for example every 30 or 45 minutes) in order to produce a lubricating impulse through which the felt lining 84 is again impregnated with contact oil.

The apparatus described has a construction which is very convenient to service. It is actually only necessary for the nuts 22, the screw 72 and the cover 34 to be released if the electrode roller 30 or the lubricating segments 78, 78' have to be replaced. The head member 16 and the guide roller 40 can then be removed in turn, then the clamping member 14 can be pulled off and the electrode roller 30 removed. If this is removed, the lubricating segments 78, 78' can also be replaced in a simple manner because only the pins 80 and the small tube 91 need be pulled out of the associated bores. The copper wire 36 is naturally removed before the nuts 22 are undone.

In the apparatus described, the supply of welding current to the electrode roller 30 is effected from the welding arm 10, via the caps 48, 48' to the clamping member 14, from the transverse web 65 of this via the contact members 64, 64' at both sides to the contact jaws 60, 60' and from these to the hub surfaces 35a, 35a' forming the actual contact surfaces of the rotating electrode roller. The welding current then flows on through the welding wire 36 and the work 38 to be welded to a counter roller which is not illustrated in the drawings and which is mounted on the upper arm of the resistance welding machine. Since the contact jaws engage round the electrode roller below and above at both sides, a large area results for the passage of current as well as a low specific contact pressure. The curved contact surfaces 62, 62' of the contact jaws 60, 60', extending over an arc length of about 90°, result in a low frictional resistance in conjunction with an appropriately selected diameter ratio at the electrode roller and the curved contact surfaces 62, 62'. The relatively rotatable surfaces 35a, 35a' and the curved contact surfaces 62, 62' are automatically continuously lubricated through the felt lubricating segments 78 as a result of which the mechanical wear between the contact surfaces is restricted to a minimum.

In FIG. 2, the flow of the coolant is illustrated by arrows and to make it clear, the individual branches of the flow of coolant are designated by the reference numerals of the cooling ducts provided for it. In FIG. 2, the coolant is supplied at the top left through the cooling duct 52 in the welding arm 10. This is in communication, through the bores provided in the cap 48, with the cooling duct 43 in the spindle 32 of the electrode roller and with the cooling duct 54 in the clamping member 14. The coolant flows out of the cooling duct 43 (through the annular chamber 41') into the substantially radial cooling ducts 39', out of these into the annular duct 37 then back through the substantially radial cooling ducts 39 (and the annular chamber 41) into the cooling duct 43' and through the cap 48' back into the cooling duct 52' in the welding arm 10. The coolant flows out of the cooling duct 54 through the cooling duct 74 in the transverse web 65 and through the cooling duct 54' and the cap 48' likewise into the cooling duct 52'. At the point X, the coolant enters a cooling duct 56', flows through the spindle 42 of the guide roller 40 and the guide roller itself in the same way as through the spindle 32 of the electrode roller and the electrode roller 30 itself and returns through a cooling duct 56 and the cooling duct 75 in the transverse web 65 to the point X from where it enters the cooling duct 54'. The cooling system described ensures an intensive cooling of the electrode roller 30, of the current-carrying surfaces 66, 66' and also of the guide roller 40.

The cover 34 is constructed in the form of a drip pan to collect splashes of contact oil, dirt resulting from abrasion and the like. This is important if the apparatus described is used in the canning industry for the production of cans for food. The cover 34 contains a groove 92' which the copper wire 36 enters on the right in FIG. 1 and from which the copper wire 36 emerges on the left in FIG. 1. As a result, the apparatus is closed at the bottom. At its outer surface, the cover 34 has the same radius of curvature as the curved outer surfaces of the welding arm 10, of the clamping member 14 and of the head member 16. If the apparatus described here is used for welding can bodies with an internal diameter of 52 mm, it has an external diameter of about 49 mm so that the work to be welded, that is to say the rounded blank 38 from which the can body is produced, can readily be conveyed from left to right over the welding arm 10 and over the apparatus described here in FIG. 1. The head member 16 may be followed on the right in FIG. 1 by further apparatuses (for example for the internal lacquering of the work being welded), which are omitted here for the sake of clarity.

The apparatus can also readily be used without the guide roller 40. In this case, the copper wire 36 is then merely taken over the guide roller 50 and round the electrode roller 30. It was already explained at the beginning, however, that during the welding of narrow can bodies (with an internal diameter of 52 mm for example), the electrode roller 30 has a smaller diameter than its counter roller. Since the diameter ratio should be 1:1, the copper wire 36 is used to lengthen the welding zone and so to simulate a diameter ratio closer to 1:1. The length of the welding zone can easily be fixed by means of the diameter of the guide roller 40.

FIGS. 8a and 8b show a form of embodiment of a contact member 164, the pivot-bearing surface 164b of which is not in the form of a spherical segment but is cylindrical in two planes. The radius r shown in the longitudinal view of FIG. 8a and in the cross-sectional view of FIG. 8b is the same in each case but this is not absolutely essential. In the contact member 164 illustrated, the contact surface 164a which can be brought into contact with the current-carrying surface, has the same construction as the pivot-bearing surface 164b. In this case, the current-carrying surface is then made complementary in construction. The contact surface 164a could also be constructed as a plane surface instead (not illustrated). This plane contact surface would then be the surface designated by F in FIG. 8a. In this case, the current-carrying surface would naturally likewise be plane in construction. The cylindrical or cambered construction of the pivot-bearing surfaces and of the contact surfaces of the contact members 164 in two planes gives the pivot bearing arrangement of the contact jaws in the region of the contact members more degrees of freedom so that they can align themselves better if there is any slight canting.

We claim:

1. An apparatus for electrical resistance seam welding by rollers, said apparatus comprising: a welding arm disposed on a machine upright and having a free end, an internally cooled electrode roller rotatably secured to the free end of the welding arm and having at least one annular contact surface rotating with the electrode roller by which welding current is supplied to the roller, two contact jaws having curved contact surfaces in contact with said at least one annular contact surface rotating with the electrode, each jaw having a contact member bearing against a current-carrying surface associated with the welding arm, spring means associated with the jaws for pressing the curved contact surfaces of the jaws and the contact members against the annular contact surface of the electrode roller and against the current-carrying surface of the welding arm respectively under spring force, a cooling device provided on the arm to supply cooling ducts in the electrode roller with coolant and a lubricating device to supply the annular and the curved contact surfaces with contact oil, and wherein the apparatus is characterized in that the electrode roller (30) includes a spindle (32) which can be clamped onto the welding arm (10) and a rotor (31) which is rotatably mounted on the spindle and which has a narrow disc-shaped center portion (33) and two broad cylindrical hubs (35,35'), the peripheral surfaces (35a, 35a') of which form two rotating annular contact surfaces, the center portion containing, immediately below its outer peripheral surface (33a), an annular cooling duct (37) which is in communication, through substantially radial cooling ducts (39,39'), with axial cooling ducts (43,43') inside the spindle (32) of the electrode roller; the welding arm (10) which acts as an electrical conductor, defines forks (24,24') at the free end (12) and has bearing depressions (26,26') in the ends of the forks (24,24') to receive the spindle (32) of the electrode roller (30); the welding arm (10) is bridged at the free end (12) by a clamping member (14) which is detachably connected thereto and acts as an electrical conductor, and the clamping member has two further bearing depressions (28,28') to receive the spindle of the electrode roller; electrically conductive caps (48,48') are placed on each end of the spindle of the electrode roller and are clamped between adjacent bearing depressions (26,28;26',28') of the arm and the clamping member to transmit current from the welding arm (10) to the clamping member (14); the contact jaws (60,60') are forked at their ends adjacent to the electrode roller and so have a total of four curved contact surfaces (62,62') making contact with the hub surfaces (35a,35a'); the contact members (64,64') are pivotally mounted in the contact jaws (60,60') and bear, with plane or cambered contact surfaces (64a, 64a'; 16a), against current-carrying surfaces (66,66') on a transverse web (65) of the clamping member; cooling ducts (52,52') are provided in the welding arm (10) and lead into the bearing depressions (26,26') of the arm which cooling ducts are in communication, through bores (48a') in the caps, both with axial cooling ducts (43,43') inside the spindle (32) of the electrode roller and with further cooling ducts (54,54';74,75) provided in the clamping member (14) and leading through the transverse web (65); and at least one felt lubricating segment (78,78') which is urged resiliently against the hub surfaces (35a,35a') and is periodically supplied with contact oil is provided as a lubricating device between the forks (24,24') of the welding arm (10).

2. An apparatus as claimed in claim 1, characterised in that two axial cooling ducts (43, 43') which are separated by a central wall (46) are provided inside the spindle (32) of the electrode roller and are in communication with the annular cooling duct (37) through two adjacent annular chambers (41, 41') inside the rotor (31) and a plurality of the substantially radial ducts (39, 39').

3. An apparatus as claimed in claim 1 characterised in that the spindle (32) of the electrode roller consists of stainless, non-magnetic steel and the rotor (31) consists of electrode copper.

4. An apparatus as claimed in claim 1 characterised in that the pivot-bearing surfaces (164b) of the contact members (164) which touch the contact jaws (60, 60') are roller shaped or are cylindrical in two planes.

5. An apparatus as claimed in claim 1 characterised in that surfaces (64b, 64b') of the contact members (64, 64') touching the contact jaws (60, 60') have the form of spherical segments.

6. An apparatus as claimed in claim 1 characterised in that the contact members (64, 64') and all contact surfaces and current-carrying surfaces are coated with precious metal, particularly silver.

7. An apparatus as claimed in claim 1, characterised in that the curved contact surfaces (62, 62') of the contact jaws (60, 60') have an arc length of about 90°.

8. An apparatus as claimed in claim 1 characterised in that the electrode roller projects from one side of the welding arm toward an article to be welded, and the clamping member (14) is closed by a cover (34) at the opposite side of the arm.

9. An apparatus as claimed in claim 1 having a copper wire which is supplied continuously, laid around the electrode roller and around a spindle-mounted guide roller and can be pressed by the electrode roller against the work to be welded, characterised in that a head member (16) is detachably secured to the end of the clamping member (14) opposite to the free end (12) of the welding arm (10), the adjacent ends of the head member and the clamping member have the same construction as the adjacent ends of the welding arm (10) and the clamping member (14) and grip between them the ends of the spindle (42) of the guide roller (40), which guide roller has the same construction as the electrode roller (30) with a somewhat smaller external diameter and is provided with similar electrically conductive caps.

10. An apparatus as claimed in claim 9, characterised in that provided in the longitudinal arms of the clamping member (14) are further cooling ducts (56, 56') which, with at least one of the further cooling ducts (75) in the transverse web (65) of the clamping member (14) and with the axial cooling ducts inside the spindle (42) of the guide roller, form a separate cooling circuit which is in communication with the other cooling ducts (54, 54') of the clamping member.

11. An electrode roller, particularly for an apparatus as claimed in claim 1, having a spindle provided with cooling ducts and having a rotor which is rotatably mounted thereon and has a disc-shaped center portion, characterised in that provided at each side of the center portion (33) are broad cylindrical hubs (35, 35'), the generated surfaces (35a, 35a') of which form electrical contact surfaces, and immediately adjacent to its outer generated surface (33a), the centre portion contains an annular cooling duct (37) which is in communication with the cooling ducts (43, 43') in the spindle (32) of the electrode roller through substantially radial cooling ducts (39, 39').

12. A welding current supply for an electrode roller, particularly for an apparatus as claimed in claim 1 having two contact jaws which are each in contact, through curved contact surfaces, with at least one annular contact surface rotating with the electrode roller and each have a contact member which is pivotally mounted in the contact jaw and bears with a contact surface against a current-carrying surface, the curved contact surfaces being able to be pressed against the annular contact surface and the contact members against the current-carrying surface by spring force, characterised in that the electrode roller (30) comprises a spindle (32) which can be firmly clamped and a rotor (31) which is rotatably mounted on the spindle and which has two broad cylindrical hubs (35, 35'), the peripheral surfaces (35a, 35a') of which form two rotating annular contact surfaces, and the contact jaws (60, 60') are forked at their ends adjacent to the electrode roller (30) and so have four curved contact surfaces (62, 62') for contact with the hub surfaces (35a, 35a')

13. A current supply as claimed in claim 12, characterised in that the pivot-bearing surfaces (64b, 64b') of the contact members (64, 64'; 164) which contact the contact jaws (60, 60') have the form of spherical segments or are cylindrical in two planes, and the adjacent surfaces on the contact jaws are complementary thereto being in the form of spherical segments or cylindrical in two planes.

14. A current supply as claimed in claim 12, characterised in that the contact surface (164b) of each contact member (164) is plane or cambered, and the current-carrying surface adjacent thereto is plane or cambered complementarily thereto.

* * * * *